United States Patent
Turnbull et al.

(10) Patent No.: US 12,443,064 B2
(45) Date of Patent: Oct. 14, 2025

(54) ELECTRO-OPTIC ELEMENT WITH INTEGRATED CAPACITIVE TOUCH SCREEN FUNCTIONALITY

(71) Applicant: Gentex Corporation, Zeeland, MI (US)

(72) Inventors: Robert R. Turnbull, Holland, MI (US); Xiaoxu Niu, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 21 days.

(21) Appl. No.: 18/237,761

(22) Filed: Aug. 24, 2023

(65) Prior Publication Data
US 2024/0069373 A1   Feb. 29, 2024

Related U.S. Application Data

(60) Provisional application No. 63/401,382, filed on Aug. 26, 2022.

(51) Int. Cl.
*G02F 1/1333* (2006.01)
*G02F 1/1343* (2006.01)
(Continued)

(52) U.S. Cl.
CPC ...... *G02F 1/13338* (2013.01); *G02F 1/13439* (2013.01); *G02F 1/155* (2013.01);
(Continued)

(58) Field of Classification Search
CPC .. G02F 1/13338; G02F 1/13439; G02F 1/155; G02F 1/163; G02F 2202/28;
(Continued)

(56) References Cited

U.S. PATENT DOCUMENTS 8,907,918 B2  12/2014  Ferreira et al.
9,625,783 B2   4/2017  Bjornard et al.
(Continued)

FOREIGN PATENT DOCUMENTS

CN    216871181 U    7/2022
EP      3975667 A1   3/2022

*Primary Examiner* — Chanh D Nguyen
*Assistant Examiner* — Gloryvid Figueroa-Gibson
(74) *Attorney, Agent, or Firm* — Price Heneveld LLP; Brian James Brewer (57) ABSTRACT

An electro-optic element including: (i) an electrochromic medium; (a) a first electro-optic conductive layer that is substantially transparent disposed to one side of the electrochromic medium; (b) a second electro-optic conductive layer disposed to another side of the electrochromic medium; (c) a capacitive touchscreen conductive layer disposed on an opposite side of the first electro-optic conductive layer as the electrochromic medium, the capacitive touchscreen conductive layer comprising a pattern and being substantially transparent; (d) a capacitive touchscreen insulating layer disposed between the capacitive touchscreen conductive layer and the first electro-optic conductive layer; and (e) electrical circuitry configured (i) to drive the capacitive touchscreen conductive layer and at least one of the first electro-optic conductive layer and the second electro-optic conductive layer together with substantially in-phase AC voltage and (ii) to provide an input DC voltage difference between the first electro-optic conductive layer and second electro-optic conductive layer is substantially constant.

20 Claims, 8 Drawing Sheets

(51) Int. Cl.
  *G02F 1/155* (2006.01)
  *G02F 1/163* (2006.01)
  *G06F 3/041* (2006.01)
  *G06F 3/044* (2006.01)

(52) U.S. Cl.
  CPC ............ *G02F 1/163* (2013.01); *G06F 3/0416* (2013.01); *G06F 3/044* (2013.01); *G02F 2202/28* (2013.01)

(58) Field of Classification Search
  CPC ........ G02F 1/157; G06F 3/0416; G06F 3/044; G06F 3/0412; G06F 3/0443; G06F 3/0445; G06F 3/0446
  See application file for complete search history.

(56) References Cited

U.S. PATENT DOCUMENTS

| | | |
|---|---|---|
| 10,877,348 B2 | 12/2020 | Kang et al. |
| 11,221,536 B2 | 1/2022 | Suzuki et al. |
| 11,386,865 B2 | 7/2022 | Wang et al. |
| 2008/0297879 A1* | 12/2008 | Tonar ................... B60Q 1/2665 359/630 |
| 2017/0031528 A1 | 2/2017 | Wang et al. |
| 2022/0137749 A1* | 5/2022 | Chuang ............... G02F 1/13338 345/173 |

* cited by examiner

ELECTRO-OPTIC ELEMENT WITH INTEGRATED CAPACITIVE TOUCH SCREEN FUNCTIONALITY

CROSS-REFERENCE TO RELATED APPLICATION

This application claims priority to and the benefit under 35 U.S.C. § 119(e) of U.S. Provisional Patent Application No. 63/401,382, filed on 26 Aug. 2022, entitled "Electro-Optic Element with Integrated Capacitive Touch Screen Functionality," the entire disclosure of which is hereby incorporated by reference.

FIELD OF THE DISCLOSURE

The present disclosure relates to electro-optic elements, and more particularly to electro-optic elements with touchscreen functionality.

BACKGROUND

Vehicles can utilize rearview assemblies to provide an operator or passenger of the vehicle with a view rearward of the vehicle. Historically, such rearview assemblies included a mirror. With the advancement of various technologies, such rearview assemblies now sometimes include additional features such as a display, an electro-optic element, one or more sensors, among other things. The electro-optic element may provide variable perceived reflectance to reduce glare. There is a general desire to add capacitive touchscreen functionality to the electro-optic element, without adding a separate touchscreen assembly thereto.

However, integrating capacitive touchscreen functionality into the electro-optic element poses problems, among other reasons, because electro-optic devices have heretofore typically used direct current (DC) while touchscreen devices have heretofore typically used alternating current (AC). Electro-optic devices typically utilize a DC architecture because they work well with a stable reference potential, such as that afforded by DC ground. The mere placement of a conductive layer of a touchscreen element over a conductive layer of the electro-optic element, separated only by a thin insulating layer, would significantly reduce the sensitivity of the touchscreen functionality, because the DC ground of the electro-optic portion directs the electrical field emitted by the conductive layer of the touchscreen element. This is so, particularly where the substrate covering the conductive layer of the touchscreen element may be significantly thicker than the insulating layer. Further, the presence of the electro-optic element increases the capacitive load upon the touchscreen device, which increases the intrinsic sensor time constant and therefore increases the touchscreen response time.

SUMMARY OF THE DISCLOSURE

The present disclosure addresses those problems with an electro-optic element that includes a first and a second electro-optic conductive layer and a capacitive touchscreen conductive layer to provide both electro-optic and touchscreen functionality, but with circuitry configured to drive at least one of the first and the second electro-optic conductive layers with AC voltages that are in-phase with AC voltage driving the capacitive touchscreen conductive layer but with a DC voltage offset between the first and the second electro-optic conductive layers, which allows the electrochromic aspects of the electro-optic device to function as intended. In addition, the circuitry effectively decouples the capacitive touchscreen conductive layer from ground, which reduces the capacitive loading while also providing an electrical shield and improving the Signal-to-Noise Ratio (SNR). One way to achieve this is to electrically isolate the first and the second electro-optic conductive layers at a desired frequency or range of frequencies. A user's touch can thus be more easily determined as a function of the impedance change on the capacitive touchscreen conductive layer. Consequently, the touchscreen functionality can be integrated into the electro-optic element without the inclusion of a touchscreen device that is driven by a voltage source totally separated from the electro-optic element.

According to a first aspect of the present disclosure, an electro-optic element comprises: (a) an electrochromic medium; (b) a first electro-optic conductive layer that is substantially transparent disposed to one side of the electrochromic medium; (c) a second electro-optic conductive layer disposed to another side of the electrochromic medium; (d) a capacitive touchscreen conductive layer disposed on an opposite side of the first electro-optic conductive layer as the electrochromic medium, the capacitive touchscreen conductive layer comprising a pattern and being substantially transparent; (e) a capacitive touchscreen insulating layer disposed between the capacitive touchscreen conductive layer and the first electro-optic conductive layer; and (f) electrical circuitry configured (i) to drive the capacitive touchscreen conductive layer and at least one of the first electro-optic conductive layer and the second electro-optic conductive layer together with substantially in-phase AC voltage and (ii) to provide a DC voltage difference between the first electro-optic conductive layer and the second electro-optic conductive layer that is substantially constant through all points in time of a sampled period of time for a set level of optical transmission through the electrochromic medium.

According to a second aspect of the present disclosure, the electro-optic element of the first aspect further comprises: (i) a second capacitive touchscreen conductive layer disposed between the capacitive touchscreen insulating layer and the first electro-optic conductive layer; and (ii) a second capacitive touchscreen insulating layer disposed between the second capacitive touchscreen conductive layer and the first electro-optic conductive layer.

According to a third aspect of the present disclosure, the electro-optic element of any one of the first through second aspects further comprises: a first substrate disposed on the opposite side of the first electro-optic conductive layer as the electrochromic medium, the first substrate comprising (i) a first surface facing away from the first electro-optic conductive layer and (ii) a second surface facing toward the first electro-optic conductive layer.

According to a fourth aspect of the present disclosure, the electro-optic element of the third aspect further comprises a second substrate disposed on another side of the second electro-optic conductive layer as the electrochromic medium, the second substrate comprising (a) a third surface upon which the second electro-optic conductive layer is disposed and (b) a fourth surface facing away from the electrochromic medium, wherein (i) the second substrate is disposed in a substantially parallel spaced apart manner relative to the first substrate such that the second surface of the first substrate faces the third surface of the second substrate, (ii) the electrochromic medium is disposed between the second surface of the first substrate and the third surface of the second substrate, and (iii) the second electro-optic conductive layer is disposed on the third surface of the second substrate.

According to a fifth aspect of the present disclosure, the electro-optic element of any one of the third through fourth aspects is presented, wherein the capacitive touchscreen conductive layer, the capacitive touchscreen insulating layer, the second capacitive touchscreen conductive layer, the second capacitive touchscreen insulating layer, and the first electro-optic conductive layer are disposed, in that respective order, on the second surface of the first substrate.

According to a sixth aspect of the present disclosure, the electro-optic element of any one of the third through fifth aspects is presented, wherein (i) the electrochromic medium comprises a solid-state composition and (ii) the second electro-optic conductive layer is disposed on the electrochromic medium, and (iii) the electrochromic medium is disposed between the first electro-optic conductive layer and the second electro-optic conductive layer.

According to a seventh aspect of the present disclosure, the electro-optic element of the fourth aspect is presented, wherein the first electro-optic conductive layer is disposed on the second surface of the first substrate.

According to an eighth aspect of the present disclosure, the electro-optic element of the seventh aspect further comprises: a third substrate comprising a fifth surface facing toward the electrochromic medium and a sixth surface facing away from the electrochromic medium, wherein, (i) the capacitive touchscreen insulating layer is disposed on the fifth surface of the third substrate, the capacitive touchscreen conductive layer is disposed on the capacitive touchscreen insulating layer, a second capacitive touchscreen conductive layer is disposed on the capacitive touchscreen insulating layer, and a second capacitive touchscreen insulating layer is disposed on the second capacitive touchscreen conductive layer, and (ii) the second capacitive touchscreen insulating layer is an optically clear adhesive affixing the second capacitive touchscreen conductive layer to the first surface of the first substrate.

According to a ninth aspect of the present disclosure, the electro-optic element of the seventh aspect further comprises: a third substrate comprising a fifth surface facing toward the electrochromic medium and a sixth surface facing away from the electrochromic medium, wherein, (i) an optically clear adhesive is disposed on the fifth surface of the third substrate, a fourth substrate is disposed on the optically clear adhesive, the capacitive touchscreen conductive layer is disposed on the fourth substrate, the capacitive touchscreen insulating layer is disposed on the capacitive touchscreen conductive layer, a second capacitive touchscreen conductive layer is disposed on the capacitive touchscreen insulating layer, a fifth substrate is disposed on the second capacitive touchscreen conductive layer, and a second capacitive touchscreen insulating layer is disposed on the second capacitive touchscreen conductive layer, (ii) the capacitive touchscreen insulating layer is an optically clear adhesive affixing the capacitive touchscreen conductive layer to the second capacitive touchscreen conductive layer, and (iii) the second capacitive touchscreen insulating layer is an optically clear adhesive affixing the fifth substrate to the first surface of the first substrate.

According to a tenth aspect of the present disclosure, an electro-optic element of any one of the first through ninth aspects is presented, wherein the electrical circuitry electrically couples the capacitive touchscreen conductive layer to at least one of the first electro-optic conductive layer and the second electro-optic conductive layer.

According to an eleventh aspect of the present disclosure, the electro-optic element of any one of the first through tenth aspects is presented, wherein the electrical circuitry is not configured to drive separately the capacitive touchscreen conductive layer with an AC voltage.

According to a twelfth aspect of the present disclosure, the electro-optic element of any one of the first through tenth aspects is presented, wherein the electrical circuitry is configured to drive separately the capacitive touchscreen conductive layer with an AC voltage.

According to a thirteenth aspect of the present disclosure, the electro-optic element of any one of the first through twelfth aspects is presented, wherein the electrical circuitry is configured so that the capacitive touchscreen conductive layer exhibits an AC voltage that is substantially in-phase with the AC voltage driving the at least one of the first electro-optic conductive layer and the second electro-optic conductive layer.

According to a fourteenth aspect of the present disclosure, the electro-optic element of any one of the first through thirteenth aspects is presented, wherein the electrical circuitry comprises a parallel LC circuit electrically isolating the first electro-optic conductive layer and the second electro-optic conductive at a desired frequency or range of frequencies of alternating current.

According to a fifteenth aspect of the present disclosure, the electro-optic element of the fourteenth aspect is presented, wherein the parallel LC circuit is configured to substantially maximize load impedance at the first electro-optic conductive layer at the desired frequency or range of frequencies of alternating current.

According to a sixteenth aspect of the present disclosure, the electro-optic element of any one of the first through thirteenth aspects is presented, wherein the electrical circuitry comprises an inductor isolating the first electro-optic conductive layer and the second electro-optic conductive layer at a desired frequency or range of frequencies of alternating current.

According to a seventeenth aspect of the present disclosure, the electro-optical element of the sixteenth aspect is presented, wherein the inductor is configured to substantially maximize load impedance at the first electro-optic conductive layer at the desired frequency or range of frequencies of alternating current.

According to an eighteenth aspect of the present disclosure, the electro-optical element of any one of the first through seventeenth aspects is presented, wherein the electrical circuitry is further configured to drive the second electro-optic conductive layer with an AC voltage.

According to a nineteenth aspect of the present disclosure, the electro-optic element of any one of the first though eighteenth aspects is presented, wherein the second electro-optic conductive layer is substantially reflective of a visible range of electromagnetic radiation.

According to a twentieth aspect of the present disclosure, a method of operating an electro-optic element comprises: with an electro-optic element comprising a first electro-optic conductive layer, a second electro-optic conductive layer, a capacitive touchscreen conductive layer, and electrical circuitry that electrically couples the capacitive touchscreen conductive layer to at least one of the first electro-optic conductive layer and the second electro-optic conductive layer, (a) driving the capacitive touchscreen conductive layer with an alternating current (AC) voltage; and (b) driving each of the first electro-optic conductive layer and the second electro-optic conductive layer with AC voltages that are substantially in-phase, but with a DC voltage difference that matches and is in-phase with the AC voltage driving the capacitive touchscreen layer, and at a frequency or range of frequencies that electrically isolates the first electro-optic conductive layer and the second electro-optic conductive layer.

These and other features, advantages, and objects of the present disclosure will be further understood and appreciated by those skilled in the art by reference to the following specification, claims, and appended drawings.

DETAILED DESCRIPTION

The present illustrated embodiments reside primarily in combinations of method steps and apparatus components related to an electro-active element with integrated touchscreen functionality. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1A:
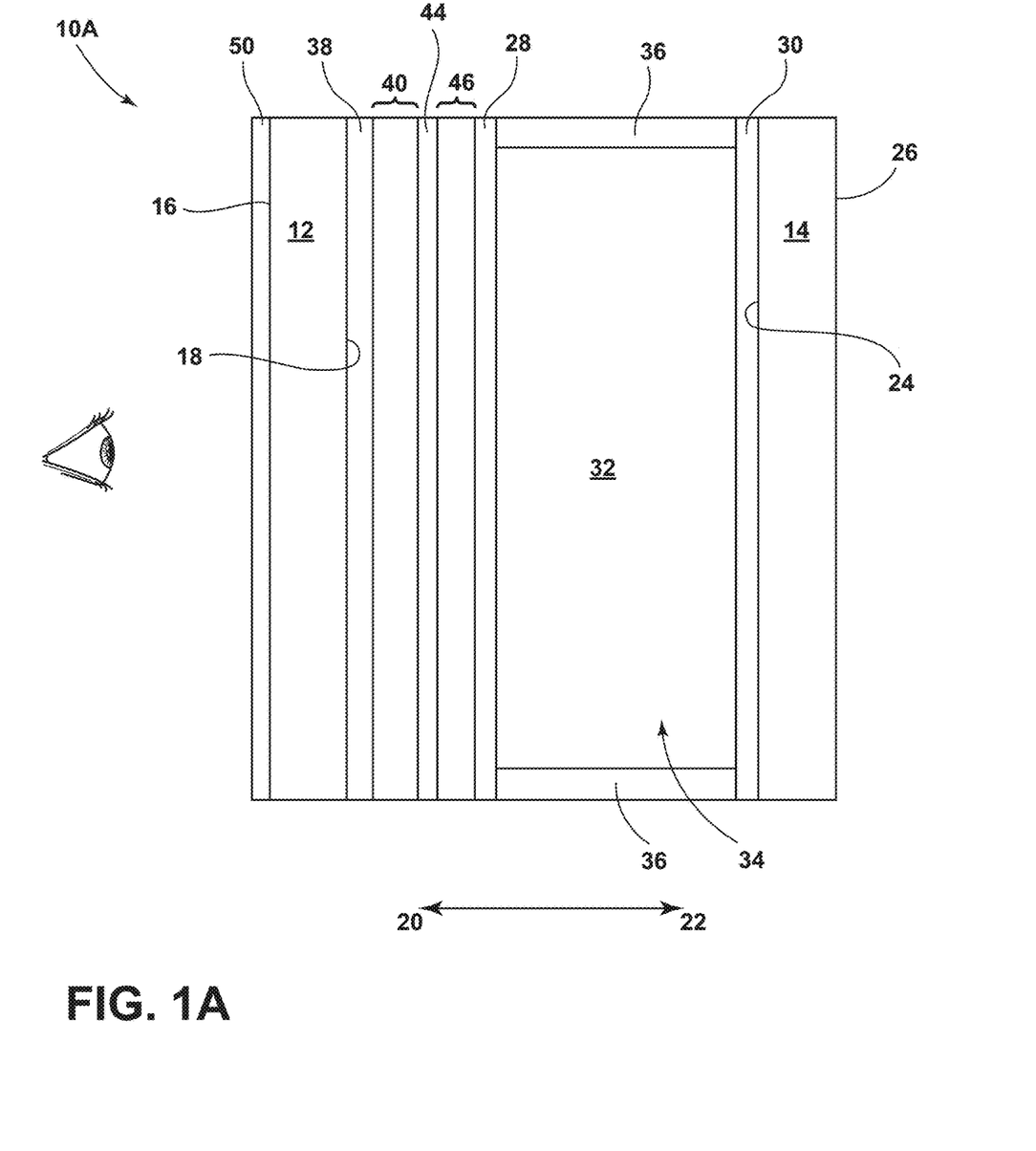
FIG. 1A is a cross-sectional elevational view of an electro-optic element of the present disclosure, illustrating a capacitive touchscreen conductive layer, a first electro-optic conductive layer, a second electro-optic conductive layer, and an electrochromic medium all disposed between a first substrate and a second substrate.

For purposes of description herein, positional terms such as "upper," "lower," "right," "left," "rear," "front," "vertical," "horizontal," and derivatives thereof, shall relate to the disclosure as oriented in FIG. 1A. Unless stated otherwise, the term "front" shall refer to a surface of the device closest to an intended viewer, and the term "rear" shall refer to a surface of the device furthest from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIG. 1A, an electro-optic element 10A includes a first substrate 12 and a second substrate 14. The first substrate 12 provides a first surface 16 and a second surface 18. The first surface 16 and the second surface 18 face in generally opposite directions 20, 22, with the first surface 16 facing in the direction 20 and the second surface 18 facing in the direction 22. The directions 20, 22 may be oriented about 180 degrees from each other. The first surface 16 and the second surface 18 are illustrated as generally planar and parallel to each other, but the first surface 16 and the second surface 18 need not be and either or both can be curved or otherwise non-planar. The electro-optic element 10A is intended to be viewed from the direction 20 to the direction 22, as indicated by the eye graphic.

The second substrate 14 provides a third surface 24 and a fourth surface 26. The third surface 24 and the fourth surface 26 face in the generally opposite directions 20, 22, with the third surface 24 facing in the direction 20 and the fourth surface 26 facing in the direction 22. The third surface 24 faces the second surface 18 of the first substrate 12 but is separated therefrom. The second substrate 14 may be substantially parallel, but spaced apart from, the first substrate 12. The third surface 24 and the fourth surface 26 are illustrated as generally planar and parallel to each other, but the third surface 24 and the fourth surface 26 need not be and either or both can be curved or otherwise non-planar. The second surface 18 of the first substrate 12 faces the third surface 24 of the second substrate 14.

The first substrate 12 and the second substrate 14 can have a polymeric composition. For example, the first substrate 12 and the second substrate 14 may have a composition including polyethylene (e.g., low and/or high density), polyethylene terephthalate (PET) (e.g., Spallshield® CPET available from Kuraray®), polyethylene naphthalate (PEN), polycarbonate (PC) (e.g., ProLens® polycarbonate, commercially available from Professional Plastics), polysulfone, acrylic polymers (e.g., poly(methyl methacrylate) (PMMA)), polymethacrylates, polyimides, polyamides (e.g., a cycloaliphatic diamine dodecanedioic acid polymer (i.e., Trogamid® CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), a fluoropolymer, polyacrylonitrile, other polymeric materials, and/or combinations thereof.

Alternatively, the first substrate 12 and the second substrate 14 can have a glass composition. For example, the first substrate 12 and the second substrate 14 may have a composition that includes: an alumino-silicate glass, such as Falcon commercially available from AGC; a boroalumino-silicate ("BAS") glass; a soda lime glass, such as ultra-clear soda lime glass; and/or a float glass. The first substrate 12 and the second substrate 14 can have the same composition but can alternatively have different compositions (e.g., one has a glass composition while the other has a polymer composition).

The electro-optic element 10A further includes a first electro-optic conductive layer 28. The first electro-optic conductive layer 28 is associated with the second surface 18 of the first substrate 12. For example, the first electro-optic conductive layer 28 is disposed over (but not necessarily directly applied to) the second surface 18 of the first substrate 12. The first surface 16 of the first substrate 12 faces away from the first electro-optic conductive layer 28. The second surface 18 of the first substrate 12 faces toward the first electro-optic conductive layer 28.

The electro-optic element 10A further includes a second electro-optic conductive layer 30. The second electro-optic conductive layer 30 is associated with the third surface 24 of the second substrate 14. In particular, the second electro-optic conductive layer 30 is disposed over (but necessarily directly applied to) the third surface 24 of the second substrate 14. In the embodiments set forth herein, the second electro-optic conductive layer 30 is disposed directly onto the third surface 24 of the second substrate 14.

The touchscreen electro-optic element 10A further includes an electrochromic medium 32. The electrochromic medium 32 is disposed between the first substrate 12 and the second substrate 14—in particular, between the second surface 18 of the first substrate 12 and the third surface 24 of the second substrate 14. The electrochromic medium 32 is disposed between the first electro-optic conductive layer 28 and the second electro-optic conductive layer 30. The first electro-optic conductive layer 28 is disposed to one side of the electrochromic medium 32, while the second electro-optic conductive layer 30 is disposed to another side of the electrochromic medium 32. The first substrate 12 and the electrochromic medium 32 are disposed on opposite sides of the first electro-optic conductive layer 28. The second substrate 14 and the second electro-optic conductive layer 30 are disposed on opposite sides of the electrochromic medium 32. The fourth surface 26 of the second substrate 14 faces away from the electrochromic medium 32.

A chamber 34 is formed between the first substrate 12 and the second substrate 14, with the assistance of a seal 36. The electrochromic medium 32 is disposed within the chamber 34. The seal 36, for example, may have a composition including an epoxy, a urethane, a cyanoacrylate, an acrylic, a polyimide, a polyamide, a polysulfide, a phenoxy resin, a polyolefin, and a silicone, among other options.

The first substrate 12 and the first electro-optic conductive layer 28 are substantially transparent to a predetermined wavelength or wavelength range of electromagnetic radiation. The second electro-optic conductive layer 30 may be substantially transparent, substantially reflective, or partially reflective and at the same time partially transparent (e.g., "transflective"). The substantial transparency can be to a wavelength or wavelength range of electromagnetic radiation in the visible range of electromagnetic radiation. The substantial transparency can be to a wavelength or wavelength range of electromagnetic radiation in the infrared, visible, and/or ultraviolet ranges of electromagnetic radiation. "Substantial transparency" for purposes of this disclosure means that the component (e.g., the first substrate 12, the first electro-optic conductive layer 28, and so on) transmits at least 40% of incident electromagnetic radiation of the wavelength or wavelength range. In some instances, the component transmits at least 50%, at least 70%, at least 80%, at least 90%, at least 95%, or at least 95.9% of the incident electromagnetic radiation of the wavelength or wavelength range.

The first electro-optic conductive layer 28 and the second electro-optic conductive layer 30 are conductive of electricity. The electrochromic medium 32 is in electrical communication with the first electro-optic conductive layer 28 and the second electro-optic conductive layer 30. The electrochromic medium 32 is operable between activated and un-activated states in response to an electrical potential applied to the first electro-optic conductive layer 28 and the second electro-optic conductive layer 30. For example, the level of optical transmission through the electrochromic medium 32 changes as a function of the input DC voltage difference between the first electro-optic conductive layer 28 and the second electro-optic conductive layer 30. Because the AC voltage components the first electro-optic conductive layer 28 and the second electro-optic conductive layer 30 are substantially in phase, the difference in voltage remains relatively constant, thus operating as an input DC voltage difference. Accordingly, electrochromic medium 32 may include, among other materials, electro-active anodic and cathodic materials. Additionally, electrochromic medium 32 may comprise one or more solvents. In some embodiments, the anodic and/or cathodic materials may be electro-optic and/or electrochromic. The electrochromic medium 32 may be a solution containing cathodic and anodic materials or include separate layers of cathodic and anodic materials. The electrochromic medium 32 can be a gel-like ion conductor. The electrochromic medium 32 may be any material system that changes its light absorption based on a potential difference between the two electrodes. Accordingly, upon activation, due to the application of an electronic voltage or potential, electrochromic medium 32 exhibits a change in absorbance at one or more wavelengths of the electromagnetic spectrum. Therefore, electrochromic medium 32 may be variably transmissive of electromagnetic radiation of the wavelength or range of wavelengths. The change in absorbance may be in the visible, ultra-violet, infra-red, and/or near infra-red regions of electromagnetic radiation. Electrochromic medium 32 may be fabricated from any one of a number of materials, including, for example, those disclosed in U.S. Pat. No. 6,433,914, entitled "Color-Stabilized Electrochromic Devices," which is herein incorporated by reference in its entirety.

Figure 1B:
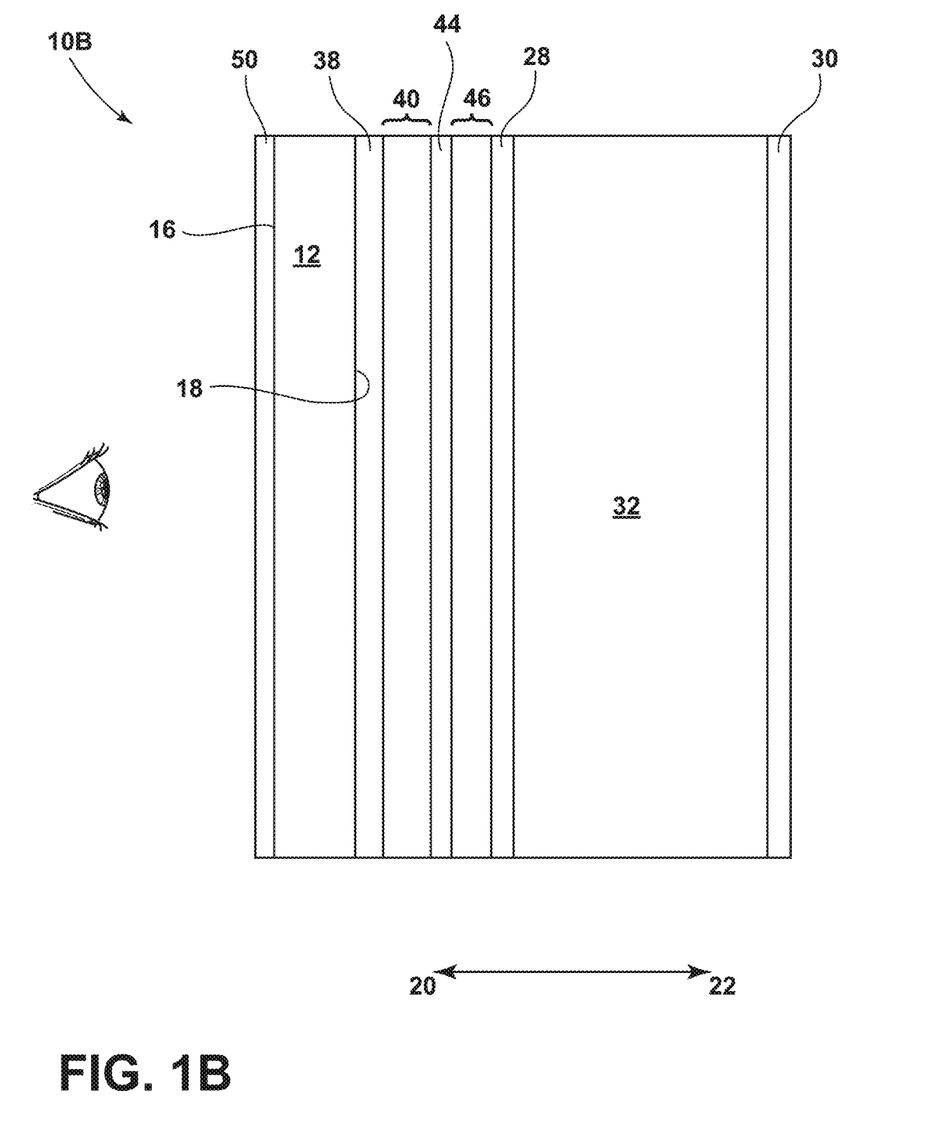
FIG. 1B is a cross-sectional elevational view of another electro-optic element of the present disclosure that is similar to the electro-optic element of FIG. 1A but without a second substrate.

In other embodiments, in reference to FIG. 1B, electro-optic element 10B is the same as the electro-optic element 10A except that there is no second substrate 14 and possibly no seal 36. With the electro-optic element 10B, the first electro-optic conductive layer 28 is still disposed over the second surface 18 of the first substrate 12. The second electro-optic conductive layer 30 is disposed on the electrochromic medium 32. The electrochromic medium 32 is disposed between (and in electrical communication with) the first electro-optic conductive layer 28 and the second electro-optic conductive layer 30, just as in the electro-optic element 10A. In such embodiments, the electrochromic medium 32 can have a solid-state composition, such as metal oxides (e.g., $WO_3$ and $MoO_3$) and conductive polymers (e.g., PEDOT), among other options.

The electro-optic elements 10A, 10B further include a capacitive touchscreen conductive layer 38. The capacitive touchscreen conductive layer 38 is conductive of electricity. The capacitive touchscreen conductive layer 38 is associated with (e.g., disposed over) the second surface 18 of the first substrate 12. The capacitive touchscreen conductive layer 38 is disposed between the first substrate 12 and the first electro-optic conductive layer 28. The capacitive touchscreen conductive layer 38 and the electrochromic medium 32 are disposed on opposite sides of the first electro-optic conductive layer 28. In some embodiments set forth herein, the capacitive touchscreen conductive layer 38 is formed directly on the second surface 18 of the first substrate 12. Intervening layers can separate the second surface 18 of the first substrate 12 from the capacitive touchscreen conductive layer 38. The capacitive touchscreen conductive layer 38 forms a pattern, such as the Manhattan pattern, the Diamond pattern, and the Flooded pattern, which are patterns known amongst those skilled in the art, among other options. Depositing the capacitive touchscreen conductive layer 38 as a pattern allows the output of the capacitive touchscreen conductive layer 38 to change as a function of a position of the user's touch on the electro-optic element 10A, 10B. The capacitive touchscreen conductive layer 38 can be configured to exhibit a sheet resistance within the range of from 1 $\Omega$/square to 300 $\Omega$/square, such as about 100 $\Omega$/square, these values are not limiting. The capacitive touchscreen conductive layer 38 can be substantially transparent to the wavelength or wavelength range of electromagnetic radiation but the capacitive touchscreen conductive layer 38 need not be.

The electro-optic elements 10A, 10B further include a capacitive touchscreen insulating layer 40. The capacitive touchscreen insulating layer 40 is associated with the first substrate 12. The capacitive touchscreen insulating layer 40 is disposed between the capacitive touchscreen conductive layer 38 and the first electro-optic conductive layer 28. The capacitive touchscreen conductive layer 38 and the capacitive touchscreen insulating layer 40 are disposed between the second surface 18 of the first substrate 12 and the first electro-optic conductive layer 28. In the embodiments set forth herein, the capacitive touchscreen insulating layer 40 is disposed on the capacitive touchscreen conductive layer 38. The capacitive touchscreen insulating layer 40 is substantially transparent to the wavelength or range of wavelengths of electromagnetic radiation. The capacitive touchscreen insulating layer 40 can have any composition that electrically insulates the capacitive touchscreen conductive layer 38 from the first electro-optic conductive layer 28 while still being substantially transparent. Example compositions include $SiO_2$, $MgO$, $Ta_2O_5$, $ZrO_2$, $MgF_2$, ITO, $TiO_x$, $CeO_x$, $SnO_2$, $ZnS$, $NiO_x$, $CrO_x$, $NbO_x$, $ZrO_x$, $WO_3$, $NiO$, $Ti_xSiO_y$, zinc oxide, aluminum zinc oxide, titanium oxide, and silicon nitride. The capacitive touchscreen insulating layer 40 can include sublayers of differing compositions and can be applied in different deposition steps (e.g., CVD, PVD, and so on). The capacitive touchscreen insulating layer 40 can be an optically clear adhesive. The capacitive touchscreen insulating layer 40 can have any thickness. In some instances, the thickness can range from 100 nm to 10 µm. The first electro-optic conductive layer 28 may be applied directly onto the capacitive touchscreen insulating layer 40.

As illustrated at FIGS. 1A and 1B, the electro-optic elements 10A, 10B can further include (but need not include) a second capacitive touchscreen conductive layer 44 and a second capacitive touchscreen insulating layer 46. In such embodiments, the second capacitive touchscreen conductive layer 44 and the second capacitive insulating layer 46 are disposed between the capacitive touchscreen insulating layer 40 and the first electro-optic conductive layer 28. The second capacitive touchscreen insulating layer 46 is disposed between the second capacitive touchscreen conductive layer 44 and the first electro-optic conductive layer 28. The second capacitive touchscreen conductive layer 44 forms a pattern, such as those already mentioned, but the pattern of the second capacitive touchscreen conductive layer 44 is oriented offset from or perpendicular to the pattern of the capacitive touchscreen conductive layer 38. Such an arrangement expands the capabilities and sensitivity of the touchscreen functionality. The second capacitive touchscreen conductive layer 44 can exhibit the same sheet resistance and transparency properties as the capacitive touchscreen conductive layer 38. Similarly, the discussion above for the capacitive touchscreen insulating layer 40 concerning properties and composition applies equally as well to the second capacitive touchscreen insulating layer 46.

The capacitive touchscreen conductive layer 38, the second capacitive touchscreen conductive layer 44, the first electro-optic conductive layer 28, and the second electro-optic conductive layer 30 can be formed of any material that is conductive of electricity while also being substantially transparent to the wavelength or wavelength range of electromagnetic radiation. For example, the capacitive touchscreen conductive layer 38, the second capacitive touchscreen conductive layer 44, the first electro-optic conductive layer 28, and the second electro-optic conductive layer 30 can each have a composition comprising a transparent conductive oxide (TCO), such as indium tin oxide (ITO), fluorine doped tin oxide (FTO), tin doped ITO, doped zinc oxide (e.g., Al:ZnO, Ga:ZnO, B:ZnO), indium zinc oxide, fluorine doped tin oxide, and antimony doped tin oxide, among others. Other possibilities for the composition of the capacitive touchscreen conductive layer 38, the second capacitive touchscreen conductive layer 44, the first electro-optic conductive layer 28, and the second electro-optic conductive layer 30 include metal oxide/Ag/metal oxide, silver nano-wire coatings, carbon nanotube coatings, graphene coatings, wire grids, and conductive polymers such as, but not limited to, poly(3,4-ethylenedioxythiophene) (PEDOT). Each of the capacitive touchscreen conductive layer 38, the second capacitive touchscreen conductive layer 44, the first electro-optic conductive layer 28, and the second electro-optic conductive layer 30 can have the same composition but alternatively can have different compositions.

With the electro-optic elements 10A, 10B, the capacitive touchscreen conductive layer 38, the capacitive touchscreen insulating layer 40, the second capacitive touchscreen conductive layer 44, the second capacitive touchscreen insulating layer 46, and the first electro-optic conductive layer 28 are disposed, in that respective order moving rearward 22, on the second surface 18 of the first substrate 12.

Figure 1C:
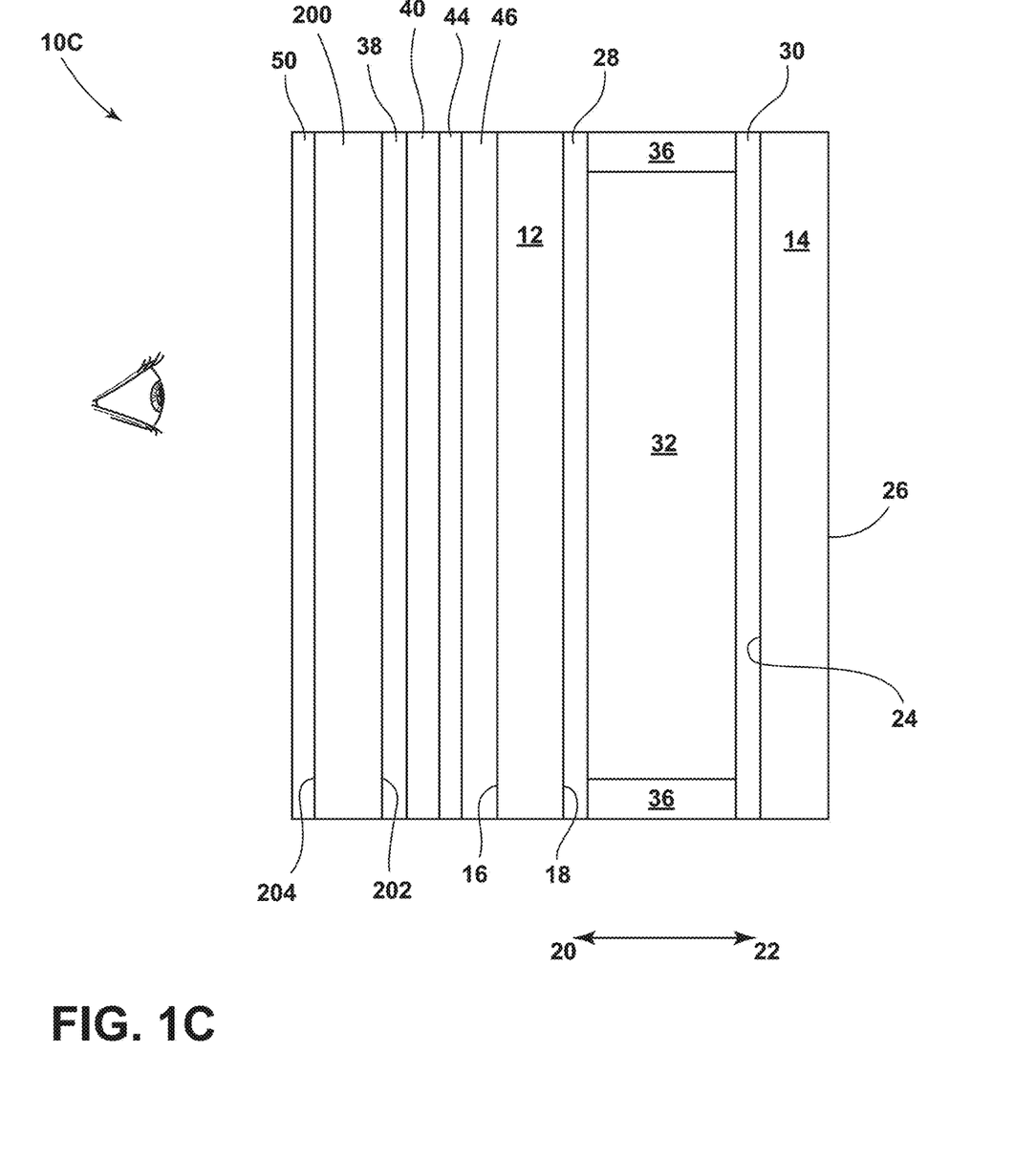
FIG. 1C is a cross-sectional elevational view of yet another electro-optic element of the present disclosure, illustrating (i) the first substrate and the second substrate sandwiching the first electro-optic conductive layer, the electrochromic medium, and the second electro-optic conductive layer and (ii) the capacitive touchscreen conductive layer disposed on a third substrate that is affixed to the first substrate.

Referring to FIG. 1C, electro-optic element 10C likewise includes the electrochromic medium 32, the first electro-optic conductive layer 28, the second electro-optic conductive layer 30, the capacitive touchscreen conductive layer 38, the capacitive touchscreen insulating layer 40, the second capacitive touchscreen conductive layer 44, and the second capacitive touchscreen insulating layer 46. The electrochromic medium 32 is disposed between the first electro-optic conductive layer 28 and the second electro-optic conductive layer 30.

In contrast to electro-optic elements 10A, 10B, the first electro-optic conductive layer 28 of the electro-optic element 10C is disposed directly on the second surface 18 of the first substrate 12. In addition, the electro-optic element 10C further includes a third substrate 200. The third substrate 200 includes a fifth surface 202 and a sixth surface 204. The fifth surface 202 faces toward the electrochromic medium 32. The sixth surface 204 faces away from the electrochromic medium 32. The capacitive touchscreen conductive layer 38 is disposed on the fifth surface 202 of the third substrate 200. The capacitive touchscreen insulating layer 40 is disposed on the capacitive touchscreen conductive layer 38. The second capacitive touchscreen conductive layer 44 is disposed on the capacitive touchscreen insulating layer 40. A second capacitive touchscreen insulating layer 46 is disposed on the second capacitive touchscreen conductive layer 44. In embodiments, the second capacitive touchscreen insulating layer 46 is an optically clear adhesive that affixes the second capacitive touchscreen conductive layer 44 (and all the layers applied to the third substrate 200) to the first surface 16 of the first substrate 12. The collection of the third substrate 200, the capacitive touchscreen conductive layer 38, capacitive touchscreen insulating layer 40, the second capacitive touchscreen conductive layer 44, and the second capacitive touchscreen insulating layer 46 can thus be formed as a module and adhered to the first surface 16 of the first substrate 12. Example optically clear adhesives include those that are acrylic-based, silicone-based, epoxy-based, and polyurethane-based, among others.

Figure 1D:
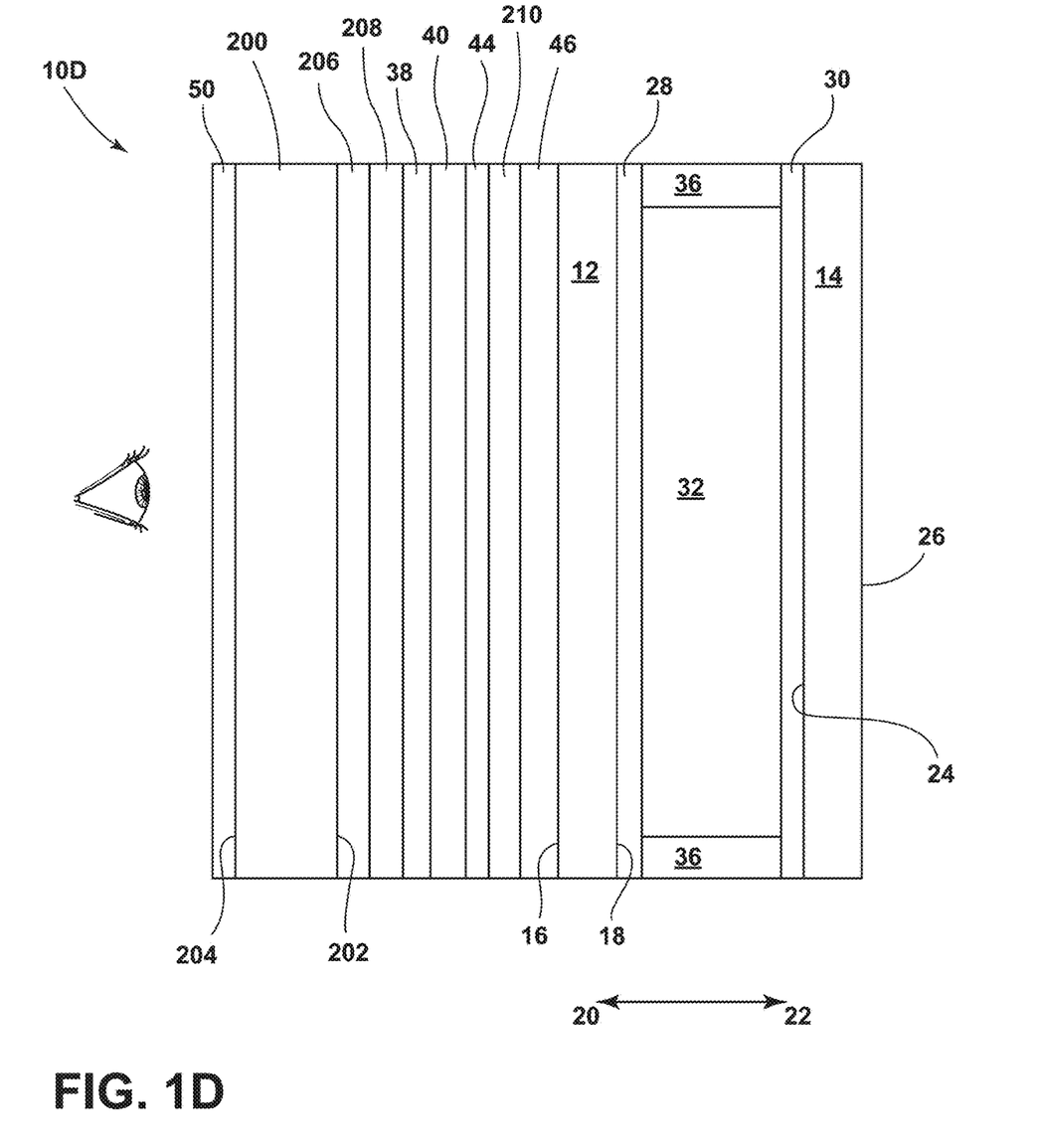
FIG. 1D is a cross-sectional elevational view of still another electro-optic element of the present disclosure similar to the electro-optic element of FIG. 1C but further including additional substrates between the third substrate and the first substrate.

Referring to FIG. 1D, electro-optic element 10D likewise includes the electrochromic medium 32, the first electro-optic conductive layer 28, the second electro-optic conductive layer 30, the capacitive touchscreen conductive layer 38, the capacitive touchscreen insulating layer 40, the second capacitive touchscreen conductive layer 44, and the second capacitive touchscreen insulating layer 46. The electrochromic medium 32 is disposed between the first electro-optic conductive layer 28 and the second electro-optic conductive layer 30. Further, like the electro-optic element 10C, the electro-optic element 10C includes the third substrate 200 with the fifth surface 202 facing toward the electrochromic medium 32 and the sixth surface 204 facing away from the electrochromic medium 32.

In contrast to electro-optic elements 10A-10C, the electro-optic element 10D further includes an optically clear adhesive 206 disposed on the fifth surface 202 of the third substrate 200. The electro-optic element 10D further includes a fourth substrate 208 that is disposed on the optically clear adhesive 206. The capacitive touchscreen conductive layer 38 is disposed on the fourth substrate 208, with the fourth substrate 208 disposed between the optically clear adhesive 206 and the capacitive touchscreen conductive layer 38. Moving conceptually rearward 22, the capacitive touchscreen insulating layer 40 is disposed on the capacitive touchscreen conductive layer 38. The second capacitive touchscreen conductive layer 44 is disposed on the capacitive touchscreen insulating layer 40. A fifth substrate 210 is disposed on the second capacitive touchscreen conductive layer 44. The second capacitive touchscreen insulating layer 46 is disposed on the fifth substrate 210. However, similar to the electro-optic element 10C, the capacitive touchscreen insulating layer 40 of the electro-optic element 10D is an optically clear adhesive affixing the capacitive touchscreen conductive layer 38 to the second capacitive touchscreen conductive layer 44. Likewise, the second capacitive touchscreen insulating layer 46 is an optically clear adhesive affixing the fifth substrate 210 to the first surface 16 of the first substrate 12.

In all embodiments (including the electro-optic elements 10A-10D), at least one of the first electro-optic conductive layer 28 and the second electro-optic conductive layer 30 is driven with an alternating current (AC) voltage relative to system ground. In the embodiments set forth herein, both the first electro-optic conductive layer 28 and the second electro-optic conductive layer 30 are driven with AC voltages that have different DC-like offsets relative to each other (e.g., the AC voltages at the first electro-optic conductive layer 28 and the second electro-optic conductive layer 30 are different but in-phase with the same amplitudes, resulting in a substantially constant DC voltage offset). In some instances, the first electro-optic conductive layer 28 is driven with an AC voltage while the second electro-optic conductive layer 30 is not separately driven with an AC voltage. Similarly, the second electro-optic conductive layer 30 can be driven with an AC voltage while the first electro-optic conductive layer 28 is not separately driven with an AC voltage.

Stated another way, the first electro-optic conductive layer 28 and the second electro-optic conductive layer 30 exhibit substantially in-phase AC voltage. In such embodiments, the voltage as a function of time at the first electro-optic conductive layer 28 and a voltage as a function of time at the second electro-optic conductive layer 30 are both substantially in-phase repeating waves having amplitudes that are substantially the same. In some embodiments, the voltage at the first electro-optic conductive layer 28 at all points in time of a sampled period of time is greater than the voltage at the second electro-optic conductive layer 30. However, in other embodiments, the voltage at the first electro-optic conductive layer 28 at all points in time of a sampled period of time is less than the voltage at the second electro-optic conductive layer 30. The electrical circuitry is configured to achieve these ends. Thus, the first electro-optic conductive layer 28 and the second electro-optic conductive layer 30 experience an input DC voltage difference between at all points in time of a sampled period of time that is substantially constant (e.g., variations in voltage difference of 10% or less, such as variations of 5% or less) for a set level of optical transmission through the electrochromic medium 32.

The electro-optic element 10A, 10B further includes electrical circuitry configured to achieve these ends, including the ends of the prior two paragraphs. Such electrical circuitry can include separate AC voltage sources or waveform generators for the first electro-optic conductive layer 28 and second electro-optic conductive layer 30. These sources generate the desired waveforms with the specified phase relationship and amplitude. Amplifiers may also be used to boost the voltage levels if required. Digital control elements, such as microcontrollers, may be employed to generate and control the desired voltage waveforms.

Driving at least one of the first electro-optic conductive layer 28 and the second electro-optic conductive layer 30 with an AC voltage relative to system ground is a departure from previous practice. Heretofore, the first electro-optic conductive layer and the second electro-optic conductive layer have been typically driven with a direct current (DC) voltage, and any AC voltage is grounded relative to the system. DC voltage has been seen as more practical because a power source having DC voltage (e.g., a 24V DC battery) typically provides the electrical power to operate an electro-optic element 10A, 10B. Further, the first electro-optic conductive layer 28 and the second electro-optic conductive layer 30 typically require little voltage to manipulate the electrochromic medium 32.

In the embodiments set forth herein, the electro-optic elements 10A-10D further include one or more coatings 50 disposed over the first surface 16 of the first substrate 12 (in the instances of electro-optic elements 10A-10B) or over the sixth surface 204 of the third substrate 200 (in the instances of electro-optic elements 10C-10D). The one or more coatings 50 may include a protective coating, an anti-fingerprint coating, or an anti-reflective coating, among other options. The one or more coatings 50 are substantially transparent to the desired wavelength or wavelength range of electromagnetic radiation.

The capacitive touchscreen conductive layer 38 is electrically coupled to at least one of the first electro-optic conductive layer 28 and the second electro-optic conductive layer 30. In other words, an electrical circuit that drives the at least one of the first electro-optic conductive layer 28 and the second electro-optic conductive layer 30 also drives or otherwise electrically connects to the capacitive touchscreen conductive layer 38. An AC voltage can separately drive the capacitive touchscreen conductive layer 38 (e.g., separately from the AC voltage driving the at least one of the first electro-optic conductive layer 28 and the second electro-optic conductive layer 30). However, an AC voltage need not separately drive the capacitive touchscreen conductive layer 38. The electrical circuitry is configured to achieve these ends. Such electrical circuitry can include conductive traces, capacitors, switches, and transistors, as well as driver circuits that generate the desired AC voltage signals, including components such as amplifiers, oscillators, and waveform generators.

The second capacitive touchscreen conductive layer 44 is electrically coupled to the at least one of the first electro-optic conductive layer 28 and the second electro-optic conductive layer 30. In other words, an electrical circuit that drives the at least one of the first electro-optic conductive layer 28 and the second electro-optic conductive layer 30 also drives or otherwise electrically connects to the second capacitive touchscreen conductive layer 44. An AC voltage can, but need not, separately drive the second capacitive touchscreen conductive layer 44. The electrical circuitry is configured to achieve these ends in the same manner discussed for the first capacitive touchscreen conductive layer 38.

The capacitive touchscreen conductive layer 38 exhibits an AC voltage that is substantially in-phase with the AC voltage driving the at least one of the first electro-optic conductive layer 28 and the second electro-optic conductive layer 30. The capacitive touchscreen conductive layer 38 exhibits an AC voltage, meaning that measurement of the voltage at the capacitive touchscreen conductive layer 38 manifests as AC voltage. The capacitive touchscreen conductive layer 38 exhibits the AC voltage regardless of whether the capacitive touchscreen conductive layer 38 is specifically driven with an AC voltage source, because the capacitive touchscreen conductive layer 38 is electrically coupled to the at least one of the first electro-optic conductive layer 28 and the second electro-optic conductive layer 30. However, when the capacitive touchscreen conductive layer 38 and the first electro-optic conductive layer 28 are each separately driven with an AC voltage, the AC voltages driving each of the capacitive touchscreen conductive layer 38 and the first electro-optic conductive layer 28 are substantially in-phase.

In addition, as mentioned, the electrical circuitry is configured so that the capacitive touchscreen conductive layer 38 exhibits an AC voltage that is substantially in-phase with the AC voltage driving the at least one of the first electro-optic conductive layer 28 and the second electro-optic conductive layer 30. There are many ways to design the electrical circuitry to achieve that objective. For example, the electrical circuitry of the electro-optic elements 10A-10D can include an inductor that isolates the first electro-optic conductive layer 28 and the second electro-optic conductive layer 30 at a desired frequency or range of frequencies of AC. In those instances, the inductor can be configured to substantially maximize load impedance at the first electro-optic conductive layer 28 at the desired frequency or range of frequencies of alternating current. As another example, the electrical circuitry of the electro-optic elements 10A-10D can include a parallel LC circuit electrically isolating the first electro-optic conductive layer 28 and the second electro-optic conductive layer 30 at the desired frequency or range of frequencies. In those instances, the parallel LC circuit can be configured to substantially maximize load impedance at the first electro-optic conductive layer 28 at the desired frequency or range of frequencies. So utilizing the inductor or the parallel LC circuit to electrically isolate the first electro-optic conductive layer 28 and the second electro-optic conductive layer 30 at the desired frequency or range of frequencies permits the first electro-optic conductive layer 28 to be driven with an AC guard waveform. The desired frequency or range of frequencies is not limiting but could be less than or equal to 500 kHz, such as less than 50 kHz, 100 kHz, 150 kHz, 200 kHz, 250 kHz, 300 kHz, 350 kHz, 400 kHz, 450 kHz, or 500 kHz, or within any range bound by any two of those values (e.g., from 50 kHz to 500 kHz, from 50 kHz to 150 kHz, from 100 kHz to 250 kHz, and so on).

Figure 2:
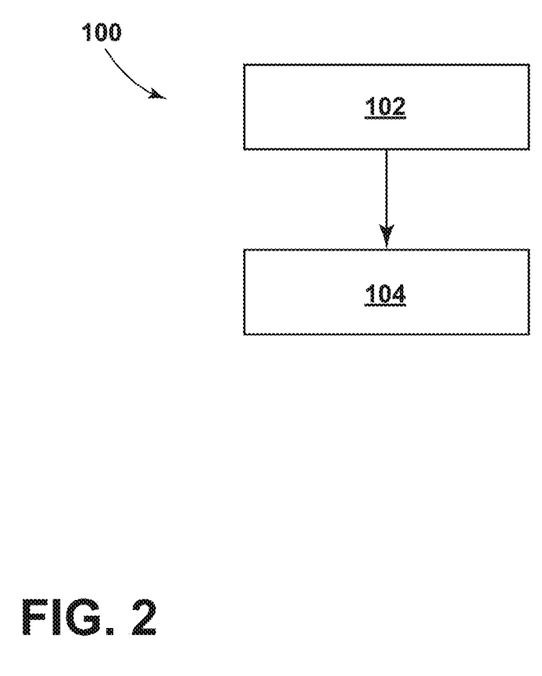
FIG. 2, is a flow chart of a method of operating the electro-optic elements FIG. 1A and FIG. 1B.

Referring now to FIG. 2, a method 100 of operating electro-optic elements 10A-10D is herein disclosed. At a step 102, the method includes driving the capacitive touchscreen conductive layer 38 with an alternating current (AC) voltage. At a step 104, the method includes driving each of the first electro-optic conductive layer 28 and the second electro-optic conductive layer 30 with AC voltages that are substantially in-phase, but with a DC voltage offset that matches and is in phase with the AC voltage driving the capacitive touchscreen layer 38, and at a frequency or range of frequencies that electrically isolates the first electro-optic conductive layer 28 and the second electro-optic conductive layer 30. The step 104 can be achieved with the electrical circuitry previously discussed. The steps 102 and 104 can occur simultaneously.

EXAMPLES

Example 1

Figure 3:
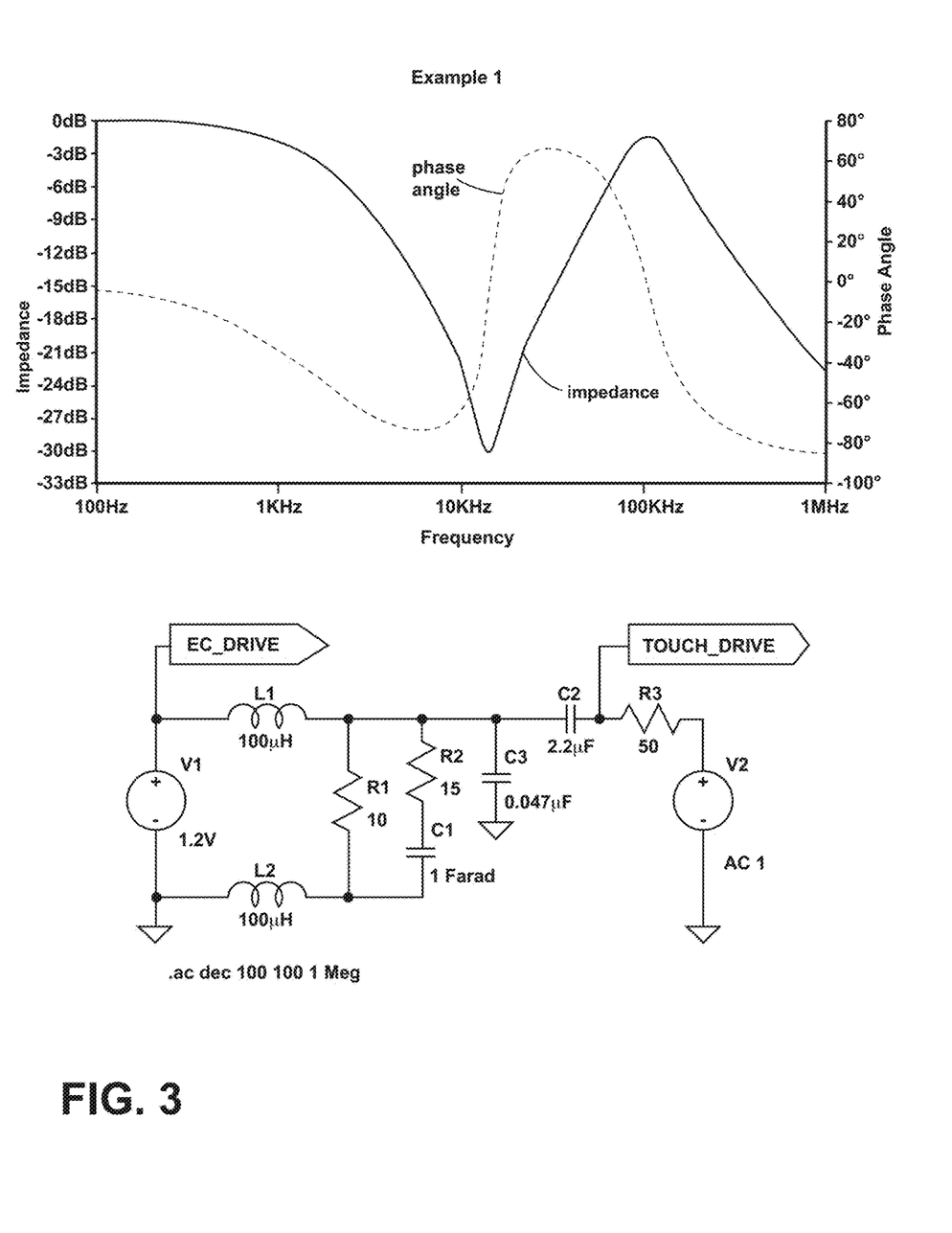
FIG. 3, pertaining to Example 1, illustrates (i) a computer modeled electrical diagram for any one of the electro-optic elements of FIG. 1A-1D and (ii) a graph plotting impedance magnitude and phase angle as a function of frequency at the capacitive touchscreen conductive layer, and showing that the impedance magnitude is at a maximum at the first electro-optic conductive layer when the frequency of AC voltage is at the desired frequency of about 100 kHz.

Referring now to FIG. 3, for Example 1, a computer modeled electrical circuit was designed to drive a capacitive touchscreen conductive layer ("TOUCH_DRIVE") with AC voltage. The computer modeled electrical circuit is illustrated at the bottom half of FIG. 3. The elements of the electrical circuit labeled R1, R2, and C1 model the first electro-optic conductive layer, the second electro-optic layer, and the electrochromic medium. The element C3 was configured to resonate the L1-L2 parallel combination to increase the load impedance at the excitation frequency of 100 kHz. Increasing the load impedance at the excitation frequency permits a lower power driver and smaller, less expensive, inductors for L1 and L2. The graph above the electrical circuit at FIG. 3 shows impedance and phase angle of the AC voltage as a function of frequency of AC voltage at the capacitive touchscreen conductive layer.

Example 2

Figure 4:
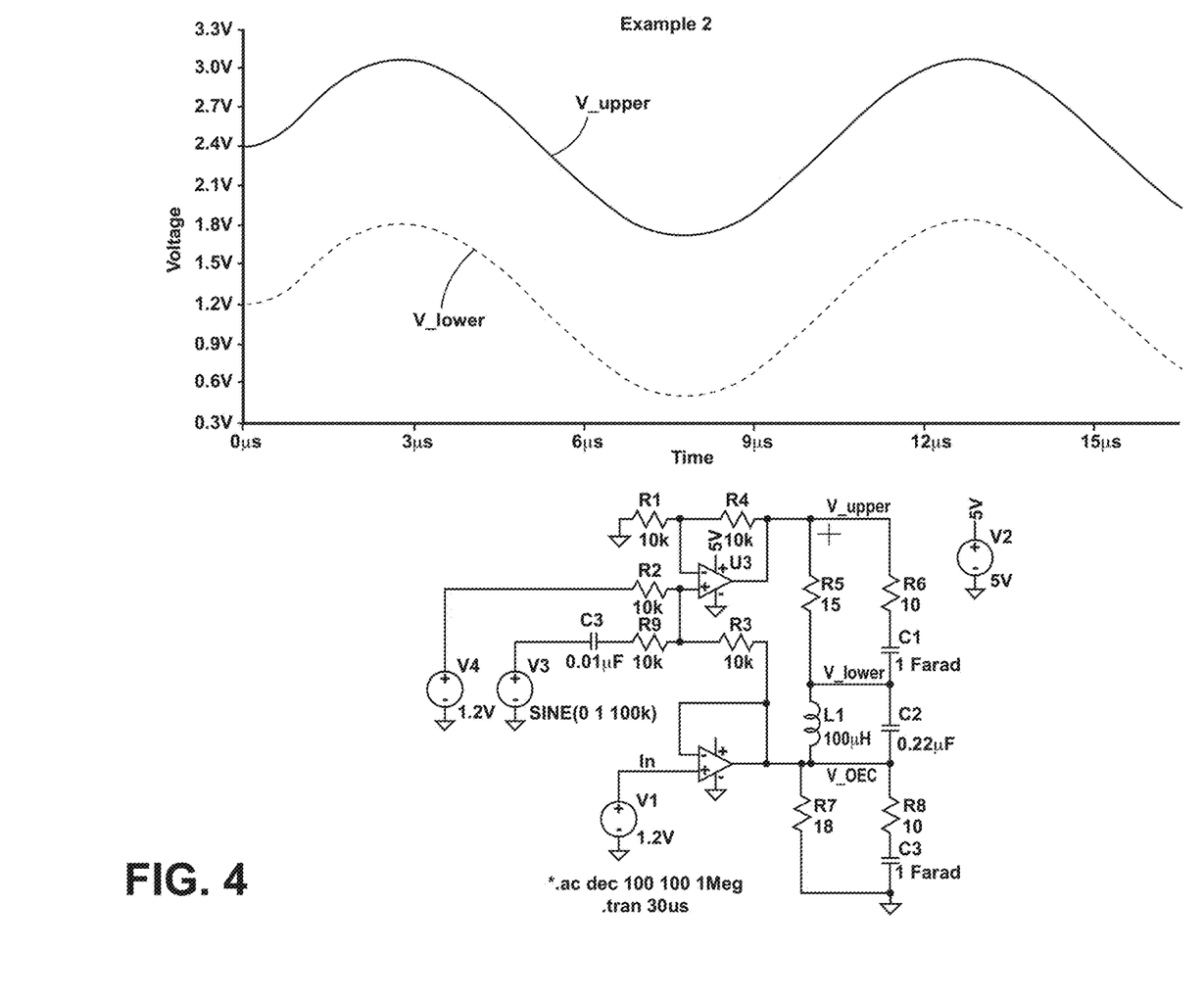
FIG. 4, pertaining to Example 2, illustrates (i) another computer modeled electrical diagram for any one of the electro-optic elements of FIGS. 1A-1D with an AC voltage driving the first electro-optic conductive layer and (ii) a graph plotting voltage as a function of time at the first electro-optic conductive layer and the second electro-optic conductive layer, with the AC component of the voltages as a function of time being substantially in-phase, and the first electro-optic conductive layer having a greater voltage than the second electro-optic conductive layer at all points in time.
Figure 5:
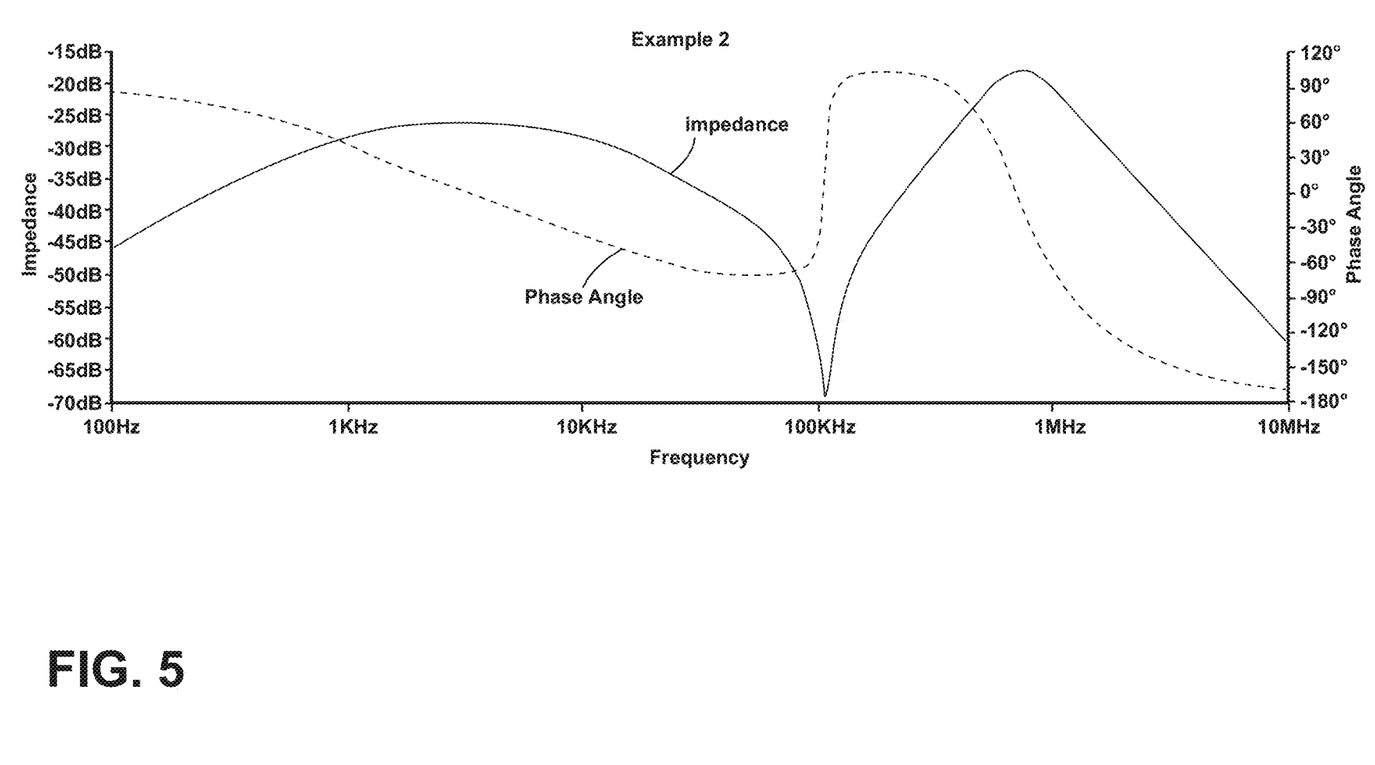
FIG. 5, pertaining to Example 2, illustrates a graph plotting impedance magnitude and phase angle as a function of frequency at one of the elements of the electrical circuit of FIG. 4, showing that the impedance magnitude is at a maximum at the first electro-optic conductive layer when the frequency of AC voltage is at the desired frequency of about 100 kHz.

Referring now to FIGS. 4 and 5, for Example 2, a computer modeled electrical circuit was designed to drive a first electro-optic conductive layer ("V_upper") with AC voltage ("V3"). The electrical circuit is shown at the bottom half of FIG. 4. The elements labeled R5, R6, and C1 at FIG. 4 model the electro-optic device between the first electro-optic conductive layer ("V_upper") and the second electro-optic conductive layer ("V_lower"). The elements labeled L1 and C2 represent a parallel LC circuit isolating the electro-optic element at the desired frequency of 100 kHz. The graph above the electrical circuit illustrates voltage as a function of time for both the first electro-optic conductive layer ("V_upper") and the second electro-optic conductive layer ("V_lower"). Both voltages are AC voltages that are substantially in-phase, with the first electro-optic conductive layer ("V_upper") having a slightly greater voltage that the second electro-optic conductive layer 30 ("V_lower") thus providing a DC voltage offset.

The graph at FIG. 5 shows the impedance and phase angle as a function of frequency of AC leaving element U3. The impedance is at a maximum around the desired frequency of 100 kHz, which shows the effect of the L1-C2 parallel LC circuit resonance to increase the AC impedance of the load.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within the described processes may be combined with other disclosed processes or steps to form structures within the scope of the present disclosure. The exemplary structures and processes disclosed herein are for illustrative purposes and are not to be construed as limiting.

What is claimed is:

1. An electro-optic element comprising:
an electrochromic medium;
a first electro-optic conductive layer that is substantially transparent disposed to one side of the electrochromic medium;
a second electro-optic conductive layer disposed to another side of the electrochromic medium;
a capacitive touchscreen conductive layer disposed on an opposite side of the first electro-optic conductive layer as the electrochromic medium, the capacitive touchscreen conductive layer comprising a pattern and being substantially transparent;
a capacitive touchscreen insulating layer disposed between the capacitive touchscreen conductive layer and the first electro-optic conductive layer; and
electrical circuitry configured (i) to drive the capacitive touchscreen conductive layer and at least one of the first electro-optic conductive layer and the second electro-optic conductive layer together with substantially in-phase alternating current (AC) voltage and, simultaneously with (i), (ii) to provide an input DC voltage difference between the first electro-optic conductive layer and the second electro-optic conductive layer that is substantially constant through all points in time of a sampled period of time for a set level of optical transmission through the electrochromic medium.

2. The electro-optic element of claim 1 further comprising:
a second capacitive touchscreen conductive layer disposed between the capacitive touchscreen insulating layer and the first electro-optic conductive layer; and
a second capacitive touchscreen insulating layer disposed between the second capacitive touchscreen conductive layer and the first electro-optic conductive layer.

3. The electro-optic element of claim 2, wherein
the capacitive touchscreen conductive layer, the capacitive touchscreen insulating layer, the second capacitive touchscreen conductive layer, the second capacitive touchscreen insulating layer, and the first electro-optic conductive layer are disposed, in that respective order, on the second surface of the first substrate.

4. The electro-optic element of claim 1 further comprising:
a first substrate disposed on the opposite side of the first electro-optic conductive layer as the electrochromic medium, the first substrate comprising (i) a first surface facing away from the first electro-optic conductive layer and (ii) a second surface facing toward the first electro-optic conductive layer.

5. The electro-optic element of claim 4 further comprising:
a second substrate disposed on another side of the second electro-optic conductive layer as the electrochromic medium, the second substrate comprising (i) a third surface upon which the second electro-optic conductive layer is disposed and (ii) a fourth surface facing away from the electrochromic medium,
wherein, the second substrate is disposed in a substantially parallel spaced apart manner relative to the first substrate such that the second surface of the first substrate faces the third surface of the second substrate,
wherein, the electrochromic medium is disposed between the second surface of the first substrate and the third surface of the second substrate, and
wherein, the second electro-optic conductive layer is disposed on the third surface of the second substrate.

6. The electro-optic element of claim 5, wherein
the first electro-optic conductive layer is disposed directly on the second surface of the first substrate.

7. The electro-optic element of claim 6 further comprising:
a third substrate comprising a fifth surface facing toward the electrochromic medium and a sixth surface facing away from the electrochromic medium,
wherein, the capacitive touchscreen conductive layer is disposed on the fifth surface of the third substrate, the capacitive touchscreen insulating layer is disposed on the capacitive touchscreen conductive layer, a second capacitive touchscreen conductive layer is disposed on the capacitive touchscreen insulating layer, and a second capacitive touchscreen insulating layer is disposed on the second capacitive touchscreen conductive layer, and
wherein, the second capacitive touchscreen insulating layer is an optically clear adhesive affixing the second capacitive touchscreen conductive layer to the first surface of the first substrate.

8. The electro-optic element of claim 6 further comprising:
a third substrate comprising a fifth surface facing toward the electrochromic medium and a sixth surface facing away from the electrochromic medium,
wherein, an optically clear adhesive is disposed on the fifth surface of the third substrate, a fourth substrate is disposed on the optically clear adhesive, the capacitive touchscreen conductive layer is disposed on the fourth substrate, the capacitive touchscreen insulating layer is disposed on the capacitive touchscreen conductive layer, a second capacitive touchscreen conductive layer is disposed on the capacitive touchscreen insulating layer, a fifth substrate is disposed on the second capacitive touchscreen conductive layer, and a second capacitive touchscreen insulating layer is disposed on the second capacitive touchscreen conductive layer,
wherein, the capacitive touchscreen insulating layer is an optically clear adhesive affixing the capacitive touchscreen conductive layer to the second capacitive touchscreen conductive layer, and
wherein, the second capacitive touchscreen insulating layer is an optically clear adhesive affixing the fifth substrate to the first surface of the first substrate.

9. The electro-optic element of claim 4, wherein
the electrochromic medium comprises a solid-state composition,
the second electro-optic conductive layer is disposed on the electrochromic medium, and
the electrochromic medium is disposed between the first electro-optic conductive layer and the second electro-optic conductive layer.

10. The electro-optic element of claim 1, wherein
the electrical circuitry electrically couples the capacitive touchscreen conductive layer to at least one of the first electro-optic conductive layer and the second electro-optic conductive layer.

11. The electro-optic element of claim 1, wherein
the electrical circuitry is not configured to drive separately the capacitive touchscreen conductive layer with an AC voltage.

12. The electro-optic element of claim 1, wherein
the electrical circuitry is configured to drive separately the capacitive touchscreen conductive layer with an AC voltage.

13. The electro-optic element of claim 1, wherein
the electrical circuitry is configured so that the capacitive touchscreen conductive layer exhibits an AC voltage that is substantially in-phase with the AC voltage driving the at least one of the first electro-optic conductive layer and the second electro-optic conductive layer.

14. The electro-optic element of claim 1, wherein
the electrical circuitry comprises a parallel LC circuit electrically isolating the first electro-optic conductive layer and the second electro-optic conductive layer at a desired frequency or range of frequencies of alternating current.

15. The electro-optic element of claim 14, wherein
the parallel LC circuit is configured to substantially maximize load impedance at the first electro-optic conductive layer at the desired frequency or range of frequencies of alternating current.

16. The electro-optic element of claim 1, wherein
the electrical circuitry comprises an inductor isolating the first electro-optic conductive layer and the second electro-optic conductive layer at a desired frequency or range of frequencies of alternating current.

17. The electro-optic element of claim 16, wherein
the inductor is configured to substantially maximize load impedance at the first electro-optic conductive layer at the desired frequency or range of frequencies of alternating current.

18. The electro-optic element of claim 1, wherein
the electrical circuitry is configured to drive the second electro-optic conductive layer with an AC voltage.

19. The electro-optic element of claim 1, wherein
the second electro-optic conductive layer is substantially reflective of a visible range of electromagnetic radiation.

20. A method of operating an electro-optic element comprising:
with an electro-optic element comprising a first electro-optic conductive layer, a second electro-optic conductive layer, a capacitive touchscreen conductive layer, and electrical circuitry that electrically couples the capacitive touchscreen conductive layer to at least one of the first electro-optic conductive layer and the second electro-optic conductive layer, driving the capacitive touchscreen conductive layer with an alternating current (AC) voltage; and driving each of the first electro-optic conductive layer and the second electro-optic conductive layer with AC voltages that are substantially in-phase, but with a DC voltage offset that matches and is in phase with the AC voltage driving the capacitive touchscreen layer, and at a frequency or range of frequencies that electrically isolates the first electro-optic conductive layer and the second electro-optic conductive layer.

* * * * *